July 16, 1968 L. W. BENNETT ET AL 3,392,893

DOCUMENT TRANSPORT DEVICE

Filed May 2, 1966

INVENTORS,
LEWIS W. BENNETT
JOHN C. SIMS JR.
BY Francis J. Thomas
ATTORNEY

United States Patent Office 3,392,893
Patented July 16, 1968

3,392,893

DOCUMENT TRANSPORT DEVICE

Lewis W. Bennett, Weston, and John C. Sims, Jr., Sudbury, Mass., assignors, by mesne assignments, to Mohawk Data Sciences Corporation, East Herkimer, N.Y., a corporation of New York Filed May 2, 1966, Ser. No. 546,758
6 Claims. (Cl. 226—74)

ABSTRACT OF THE DISCLOSURE

Document transport means including an endless flexible band having sprocket teeth on one side for engaging transport perforations in the document and having on the other side drive lugs engageable by a drive sprocket. Each sprocket tooth has a mounting pin extending through a hole in the band, each mounting pin being clamped onto by a drive lug. A system of idler pulleys guides the band such that the document is engaged by a pair of spaced-apart regions on the band whereby the document is fed to and from an operating station located between the two band regions. Adjustment of the pulleys enables relative movement between the portions of the band in the two regions, causing varying degrees of tension to be applied to the document.

This invention relates to a document transport device and, in particular, to a tractor assembly for transporting documents containing one or more rows of transport holes aligned in the direction of movement of the documents.

In many applications, such as in data processing peripheral equipment, documents must be accurately positioned for printing, perforating, scanning or other operations. As examples, tape punches, tape readers, and printers require that documents (tape or paper) be accurately positioned during operation. The documents generally contain one or more rows of accurately-spaced transport holes which are engaged by sprockets in tractor devices so that controlled movements of the tractor devices position the documents.

The previously-known tractor devices generally contain two rotating pulleys, including at least one toothed drive pulley, which support and control a short closed-loop chain, the links of which are configured to mesh with the teeth on the drive pulley. The chain also contains sprockets around its periphery which engage the transport holes in the documents to effect positioning. These tractor devices are not only complicated and expensive but, when used in pairs on opposite sides of (before and after) the operating (printing, punching or reading) mechanism, also require separate drive linkages which must be accurately aligned.

In the present invention, document transport is effected by a simple tractor drive employing a closed loop of flexible tape which supports sprockets on its outer surface and drive lugs or teeth on its inner surface. Preferably, the sprockets contain flange-like faces which rest on the outer surface of the tape and contain pins behind which pass through holes in the tape and are gripped on the opposite (inner) surface of the tape by lugs. In this configuration, the lugs serve the dual function of attaching the sprockets to the tape and serving as the driven members in the tractor drive mechanism. The tape is mounted on pulleys, at least one of which is a drive pulley containing depressions to coact with the lugs for positioning the tape. Not only is the inventive tractor device simple and economical in construction, but, as the result of the extreme flexibility of the tape, the tape can be arranged in various configurations which are not readily achievable with chain-type devices. One such configuration eliminates the need of separately driven tractor devices on opposite sides of the operating mechanism, as the tape is driven around a U-shaped path to provide document transport at two separate regions along its length.

It is thus an object of the present invention to provide an improved document transport device employing a closed loop of flexible tape which supports document-positioning members, such as sprockets.

Another object of the present invention is to provide an improved document transport device employing a closed loop of flexible tape which supports document-positioning members, such as sprockets, or its outer surface, the members being maintained on the tape by lugs on the inner surface of the tape that are affixed to the members, where the lugs coact with a driving member to position the tape.

The foregoing and other objects, features and advantages of the invention will be apparent from the following more particular description of a preferred embodiment of the invention, as illustrated in the acompanying drawings.

Figures 1, 2:
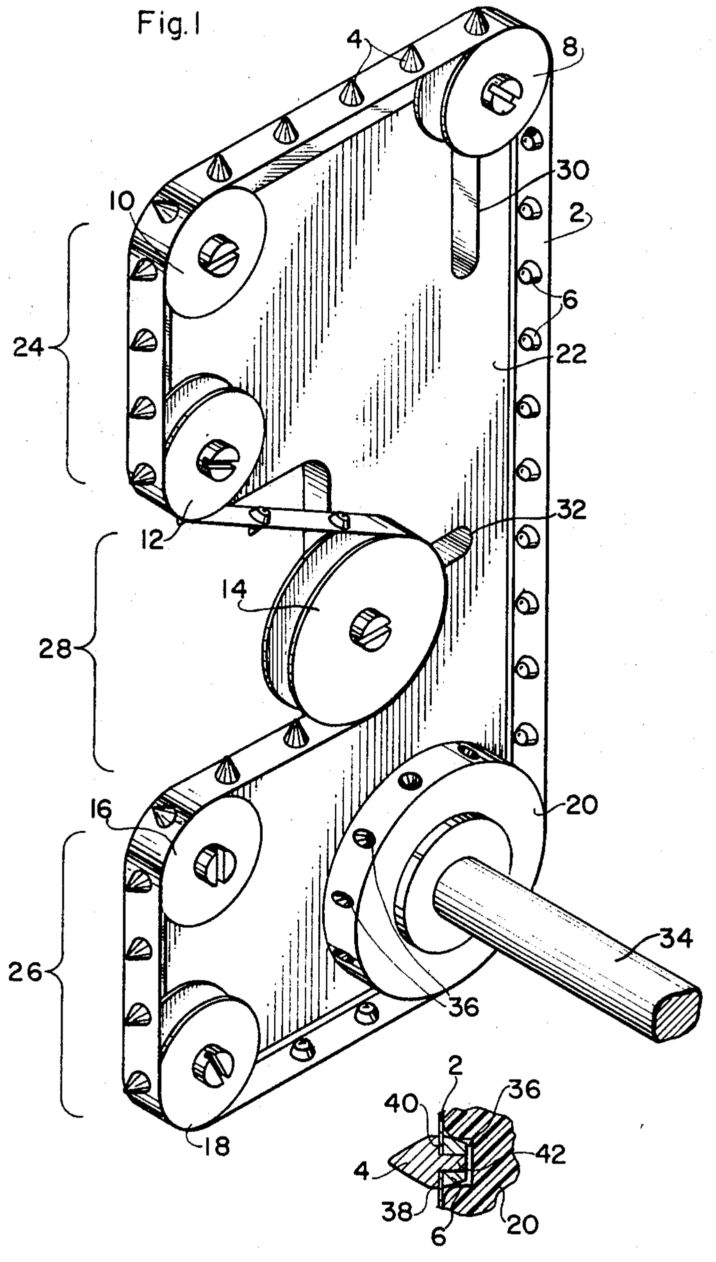
FIGURE 1 is an isometric view of a preferred embodiment of the inventive document transport device.
FIGURE 2 is a cross-sectional view of a portion of the drive mechanism for the transport device shown in FIGURE 1.

As shown in FIG. 1, the tractor device consists of a closed loop of tape 2 supporting evenly-spaced sprockets 4 which are mounted through holes in the tape by lugs 6. The tape is made of a material which is relatively insensitive to tension, temperature and other variations in operating conditions, and is preferably constructed of woven glass bonded with Teflon. A closed loop of tape is achieved by overlapping the ends of a strip of tape and affixing one or more sprockets and lugs through both thicknesses of the overlapping tape.

The tape is threaded on a group of idler pulleys 8–18 and a drive pulley 20, and all of the pulleys are mounted for revolution on a frame 22. The pulleys are arranged so that the sprockets 4 traverse two co-linear paths 24 and 26 separated by an operating region 28. In this manner the sprockets in regions 24 and 26 are adapted to coact with the drive holes in the document at positions above and below the region 28. Thus a single tractor device is conveniently used while providing adequate space for the operating mechanism.

The spacing between sprockets 4 coincides with the spacing between the drive holes on the document. Thus it is necessary that the sprockets in region 24 be appropriately spaced with respect to the sprockets in region 26 to avoid slack or tearing of the paper in the intermediate region 28. To accomplish this, pulleys 8 and 14 are adjustably mounted in grooves 30 and 32 in the frame 22. In order to effect proper spacing, pulley 8 is loosened and pulley 14 is adjusted and locked in position. Then pulley 8 is then moved upward until the tape is tense and this pulley is locked in position. When correctly adjusted, the distance between any sprocket in region 24 and any sprocket in region 26 equals an integral multiple of the distance between sprockets (presuming that the paper is to be maintained along a straight line in the operating region 28—if the operating mechanism requires a slack document in region 28, the pulley adjustments are made to effect this condition).

The document is moved either incrementally or continuously by corresponding rotation of the drive pulley 28 under the control of a drive shaft 34. The drive pulley 20 contains spaced indentations 36 which coact with the lugs 6 on the inner side of the tape 2 to effect movement of the tape when the drive shaft is rotated. The action of the lugs 6 and indentations 36 is more clearly shown in FIG. 2.

The shape of these elements conforms to those of a gear form so that there is a minimum of friction and backlash in the device. FIG. 2 also shows the shape of sprockets 4 in greater detail. The sprockets have a cylindrical portion 38 with a depth at least equal to the thickness of the document being transported. A flange portion 40 of the sprocket is maintained against the outer surface of the tape by the lug 6 which is affixed to a rear projection 42 on the sprocket. The lug is force-fitted or riveted to the rear projection of the sprocket.

While the inventive tape-supported tractor device has been shown with two document transport regions 24 and 26, the device can obviously be arranged with only a single transport region or with as many as desired. Similarly the tape drive can be controlled by mounting gear teeth or other projections on the inner side of the tape in place of the lugs 6 that have been shown. Alternatively, the tape can be molded with teeth on its inward side and the teeth can be driven by well-known techniques.

As a further alternative, a document can be driven by friction by using an appropriate tape material without sprockets. The tape itself can also be driven by a friction pulley instead of using lugs.

While the invention has been particularly shown and described with reference to a preferred embodiment thereof, it will be understood by those skilled in the art that various changes in form and details may be made therein without departing from the spirit and scope of the invention.

What is claimed is:

1. A device for transporting perforated documents, comprising, in combination:

an endless band having transport projections on at least one side spaced apart by a distance corresponding to the spacing of the perforations in said document;

pulley means constructed and arranged to position a plurality of spaced-apart regions on said band adjacent to said document whereby the transport projections on said regions engage the perforations of a plurality of spaced-apart regions on said document; and drive means for driving said band on said pulleys to transport said document.

2. The device set forth in claim 1 wherein said band is additionally provided with a plurality of spaced drive projections on the side opposite said transport projections and wherein said drive means includes means for positively engaging said drive projections.

3. The device set forth in claim 2 wherein each said transport projection includes a tooth portion extending outwardly from said band and having a mounting pin extending through a hole in said band; and wherein each said drive projection includes a lug member attached to the portion of said pin extending through said hole.

4. The device set forth in claim 1, wherein said pulley means is provided with adjustment means to enable relative movement between those portions of said band included in said spaced-apart regions, whereby varying degrees of tension can be applied to the portion of said document extending between said regions.

5. The device set forth in claim 1, wherein said pulley means comprises:

a first pair of pulleys engaging the drive side of said band to establish a first of said spaced-apart regions;

a second pair of pulleys engaging the drive side of said band to establish a second of said regions; and an idler pulley engaging the transport side of a portion of the band interconnecting said spaced-apart regions whereby said interconnecting portion is guided in non-engaging relation with respect to said document.

6. The device set forth in claim 5, further comprising:

adjustment means for adjusting the position of said idler pulley toward and away from said document to cause relative movement between said first and second regions of said band whereby the tension in said document is varied.

References Cited

FOREIGN PATENTS 649,199 1/1951 Great Britain.

ALLEN N. KNOWLES, *Primary Examiner.*